May 19, 1953
D. McSKIMMON
2,638,679
MEASURING INSTRUMENT
Filed Feb. 4, 1950
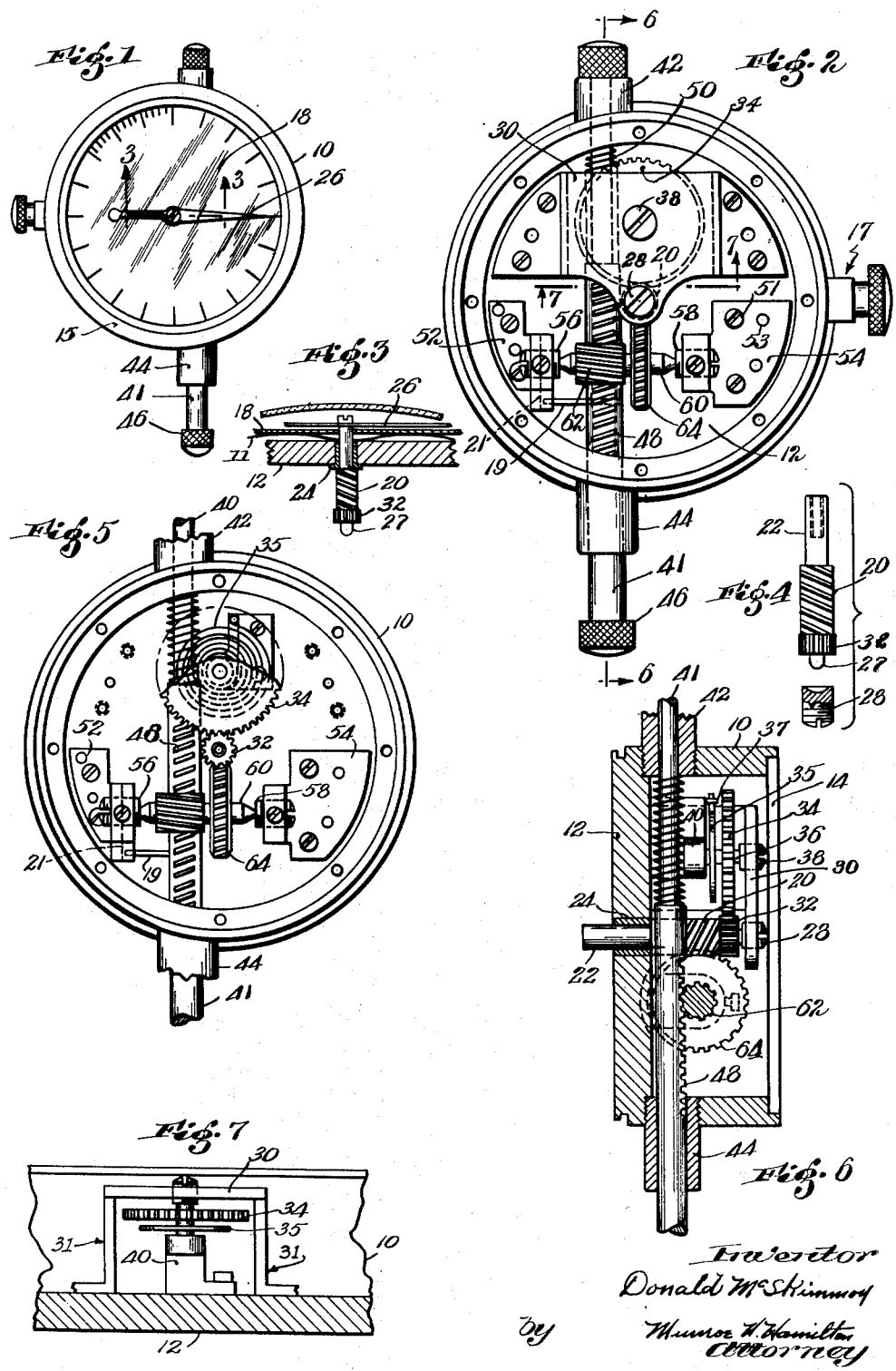
Inventor
Donald McSkimmon
by Munroe W. Hamilton
Attorney Patented May 19, 1953

2,638,679

UNITED STATES PATENT OFFICE 2,638,679

MEASURING INSTRUMENT

Donald McSkimmon, Cranston, R. I.

Application February 4, 1950, Serial No. 142,469

9 Claims. (Cl. 33—172)

This invention relates to a dial gage of the type in which a contact plunger, supported at one side of a case for the gage, is employed to carry out fine measurements and to locate a pointer in positions of register with respect to the dial portion of the gage.

In the usual construction of gages of this type it is, in many cases, difficult to combine durability and resistance to wear with a satisfactorily smooth and accurate operation by which continuous use of the device may be realized over relatively long periods of time without development of error, or without the necessity for troublesome or expensive repairs. As a result, the life of such gages is relatively short and they must be replaced frequently, increasing the cost of various types of machine operations.

The present invention is concerned with the problem indicated and aims to provide a measuring instrument which is characterized by unusually high resistance to wear, with the result that the average working life of this type of instrument is greatly increased in comparison with conventional gages now in use.

It is a further object of the invention to provide a gage characterized by unusual ease of operation and accuracy, such as will greatly facilitate very fine measuring operations. Still another object is to devise a gage which is substantially free from lost motion between the operating parts and which includes means for carrying out delicate adjustments to compensate for loss of adjustment at those points in the gage where a small amount of wear may develop after a considerable period of time.

These and other objects and novel features will be more fully understood and appreciated from the following description of a preferred embodiment of the invention selected for purposes of illustration and shown in the accompanying drawings, in which Fig. 1 is a plan view of the measuring instrument of the invention;

Fig. 2 is a bottom plan view with the back cover removed from the instrument case to more clearly illustrate the indicator mechanism;

Fig. 3 is a cross-section taken on the line 3—3;

Fig. 4 is a detailed elevational view of a worm member employed in the measuring instrument;

Fig. 5 is another bottom plan view with a part of the supporting bracket mechanism removed;

Fig. 6 is a cross-section taken on the line 6—6 of Fig. 2; and

Fig. 7 is a cross-section and fragmentary elevational view taken on the line 7—7 of Fig. 2.

In accordance with the invention, I have provided an improved dial gage in which movement of a pointer is carried out with the aid of a threaded member in the form of a worm which is directly attached to the pointer and which is arranged for rotative movement axially of a supporting case. The worm and its actuating mechanism are constructed and arranged to resist to a maximum degree the development of wear and there is further combined with this particular arrangement a multiple bearing assembly and spring adjustment which cooperate with the worm and its actuating mechanism to constantly exert a working tension on the worm as well as to take up end play in this member.

In the construction shown in the drawings, numeral 10 denotes a case which preferably consists of a tubular body closed by two spaced-apart end walls 12 and 14. End wall 14 is secured by screws or other fastenings in shouldered portions of the tubular body, as shown in Fig. 6, and constitutes a rear cover which may be quickly removed to permit ready access to the dial mechanism.

The end wall 12 is preferably formed as an integral part of the tubular body portion and thus constitutes a very simple and easily constructed one-piece case in which all parts of the gaging mechanism may be very easily installed or removed, as desired. Located in spaced relation to member 12, against a warped spring 11, is a dial 18 bearing on its face units of measurement common to instruments of this character. A front cover 15 is fitted over the peripheral edge of wall 12 and adjustably secured by means of a clamp and screw assembly 17.

Mounted for rotation axially of this case is a helical worm member 20 which is formed with a reduced end portion 22 axially located through the end wall 12. The reduced portion 22 passes through a collar bearing 24 pressed into the end wall and in which the reduced portion turns to swing a pointer member 26 about the dial 18, as is suggested in Fig. 1. At its opposite extremity worm 20 is again reduced in diameter to provide a hardened bearing tip 27 which is received in a hardened cup bearing 28. The latter member is adjustably threaded into a bracket 30 supported on angle pieces 31 in the case 10. Rotation of the worm in one direction tends to force the tip 27 against the bearing 28 and the latter member may be adjusted to oppose thrust and wear of the worm tip 27 and to take up end play of the worm. The bearing 28 is formed with a slotted head into which a screw-driver may be entered to adjust this bearing, as desired.

Fixed about the reduced end 27 of worm 20 is a pinion 32 which is adapted to be driven by a larger gear 34, in turn mounted on a shaft 36. The upper end of shaft 36 is formed with a hardened bearing tip and is supported in an adjustable threaded bearing member 38 in bracket 30 which functions to maintain the lower end of the shaft 36 against a fixed bearing 40. The purpose of the adjustable threaded bearing 38 is to locate and maintain the gear 34 in proper relative meshing position with respect to the pinion 32 and the bearing 38 thus cooperates with the bearing 28 to properly adjust the worm and hold it in a freely operative position. Gear 34 is resiliently maintained in the rest position shown in the drawings by means of a hair spring 35, one end of which is fastened to a stud 37 on the member 40. The opposite end of the spring is anchored to the shaft 36 and turns this member, together with gear 34, when tightened about itself. By means of this arrangement a working tension is constantly maintained on the worm, thus preventing lost rotative motion between the worm and its actuating mechanism described below.

Slidably disposed through the sides of the case 10 is a plunger 41 having its ends supported in bushings 42 and 44 and carrying at one outer extremity a contact button 46. At its intermediate portion the plunger is formed with a substantially rectangular cross-section and, in addition, is provided along an upper edge thereof with teeth forming a helical rack 48. Supported between the rack portion of the plunger and the inner end of the bushing 42 is a coiled spring 50 which functions to maintain the plunger in a normally extended position, such as that shown in Fig. 2. Solidly secured to the end wall 12 are two brackets 52 and 54 arranged in spaced-apart relation at either side of the rack 48. These brackets may be secured to the end wall by screws 51 and also by pins 53 which extend into openings formed in the end wall for this purpose.

I have also provided at one side of the rack a guide member 19 which is adapted to slide in a channel 21 formed along one side of the adjacent bracket. This arrangement also tends to prevent rotation of the rack and to hold this member in a true path of reciprocation which is at right angles to the axis of rotation of the worm.

Uppermost portions of the brackets extend above the rack 48 and are formed with respective bearing openings in which are transversely and adjustably located respective hardened bearings 56 and 58. At their outer ends the bearings are formed with slotted heads into which a tool may be engaged to advance or withdraw the bearings transversely of the brackets 52 and 54. Preferably the bearings 56 and 58 are of the miniature ball bearing type and include a miniature ball race and a series of balls loosely contained therein with the ball race being fitted tightly within the bore of its threaded bearing body.

Pivotally received between the bearings 56 and 58 is a shaft 60 formed with hardened tapered ends, as shown in Fig. 2, and has secured at one point thereon a helical pinion 62 which meshes with the teeth of the rack 48. Closely adjacent to the pinion 62, and fixed on the shaft 60, is a worm wheel 64 also formed with hardened helical teeth. The helical teeth of the worm wheel are arranged to mesh with and drive the threads of the worm 20, as will be apparent from an inspection of Fig. 6.

When the rack 48 is forced inwardly by pressure on the contact button 46, as normally occurs in a gaging operation, the rack 48 rotates the shaft 60 through the pinion 62 which, in turn, drives the worm wheel 64 and rotates the worm 20. Since the pointer 26 is fixed directly to the outer extremity of the worm, the pointer will be turned to a predetermined position of register on the dial 18, thus furnishing the desired reading.

Rotation of the worm 20 turns the gear 34 through the pinion 32 through a limited arc of rotation against the action of the hair spring 35 above described. It will be obvious, therefore, that upon releasing the plunger 41, a constant torque is exerted upon the worm 20 causing it to instantly revert to its normal starting position.

It is pointed out that the combination of an axially disposed worm and a thrust bearing arranged in the manner illustrated by bearing 28 allows the latter member to efficiently oppose the thrust of the worm member when driven by the worm wheel. By a proper and conveniently effected adjustment of the bearing 28, it becomes possible to provide for a freely rotating movement of the worm and yet eliminate substantially all end play in this member, such as would normally occur from slight wear taking place due to the thrust action above described. Moreover, the bearing 38 cooperates with bearing 28 to provide a multiple adjustment for maintaining the worm in an accurate and yet freely rotative position with respect to its actuating rack mechanism. This is achieved by constantly maintaining the gear 34 in proper relative position to the pinion 32 whenever axial adjustment of bearing 28 takes place. It is pointed out that without bearing 38 there might ensue an improper engagement of the large gear 34 with pinion 32 to interfere with free rotation of the worm.

It will be apparent, therefore, that I have provided a unique worm-driven gage assembly in which the plunger movement is directed along an axis at right angles to the axis of rotation of the worm and in which a working tension is constantly exerted to hold the worm and its actuating mechanism closely coupled to one another and in which end play, as well as wear, are substantially reduced or eliminated. In the case of the rack, gears, worm wheel and worm, hardened helical teeth are employed to withstand long useage and, similarly, the ends of the worm wheel shaft, as well as the worm and other actuating mechanism, are also formed with hardened portions. The brackets are secured in the end wall 12 by means of screws, and also locked against rotative movement by means of pins which extend into openings above referred to formed through the end wall 12.

Having thus described my invention, what I desire to claim as new is:

1. A measuring instrument of the class described comprising a case having a tubular portion closed by spaced-apart end walls, a dial secured adjacent an outer side of one of the end walls, a worm mounted through the dial covered end wall for rotative movement axially of the case, said worm having a pointer directly secured at an outer end thereof to register with the dial, the opposite end of the worm being received in a bearing member adjustable in a direction inwardly and axially of the worm to take up end play of the latter member, reciprocating rack and gear mechanism operatively connected to the worm to impart rotative movement in one direction, an externally projecting plunger for actuating the reciprocating rack and gear mechanism, torque producing means connected to the worm for exerting a rotative force on the worm in opposed relationship to the force exerted by the rack and gear mechanism.

2. A device as described in claim 1, in which the torque producing means includes spring means for maintaining a working tension on the worm, gear means responsive to the action of the spring means for turning the worm about its longitudinal axis, and a second adjustable bearing cooperating with said first adjustable bearing to maintain the worm and spring means positioned in proper relative position to one another.

3. A device as described in claim 2, in which the torque producing means further includes a small gear fixed at one end of the worm, a second gear in mesh with the first gear, and a coiled spring having one extremity anchored to the case and the opposite extremity attached to the second gear for the purpose of maintaining a working tension on the worm.

4. A device as described in claim 1, in which the reciprocating rack and gear mechanism includes a rack movable along an axis at right angles to the worm, a pinion mounted for engagement by the rack, a worm wheel responsive to rotation of the pinion, said worm wheel being adapted to mesh with and drive said worm.

5. A measuring instrument of the class described, comprising a cylindrical case presenting a dial at one side thereof, a worm mounted for rotative movement axially of the case and having a pointer fixed at one end thereof in position to register with the dial, a pair of brackets located in the case at either side of the worm, transversely adjustable bearings received in the brackets, a shaft member supported at either end in the bearings, a worm wheel fixed to the shaft in position to be engaged by the worm, a gear fast on the shaft at one side of the worm wheel, a rack constructed and arranged for reciprocating movement between the inner peripheral walls of the case to actuate the gear and worm wheel and turn the worm and pointer, and a resiliently supported rod connected to the rack and projecting outwardly from one side of the case and spring means connected to the worm to oppose rotative movement of the worm by the rack and gear mechanism.

6. A measuring instrument of the class described, comprising a case having a tubular body portion closed by spaced-apart end walls, a dial fixed adjacent to an outer surface of one of the end walls, a worm mounted for rotative movement axially of the case, said worm having a pointer directly secured at an outer end thereof in a position to register with the dial, reciprocating rack and gear mechanism including a contact plunger element supported in the tubular body portion, a worm wheel operating in response to movement of the rack and gear mechanism to turn the worm in a direction such that it seeks to advance axially away from the said dial, a torque producing mechanism connected to the worm, said torque producing mechanism including a spring-held gear rotatable with the worm about an axis lying in parallel spaced relation to the axis of the worm, said torque producing mechanism being operative to constantly exert a torque force in a direction opposite to the direction of rotation produced in the worm when the plunger is depressed.

7. A device as described in claim 6, in which the said worm wheel rotates in a plane which passes through the axis of rotation of the worm and the axis of the spring-held gear.

8. A device as described in claim 6, including means for adjustably maintaining the axis of rotation of the spring-held gear and the axis of rotation of the worm in constant parallel relationship to one another.

9. A device as described in claim 6, including a pair of cooperating adjustment bearing members for maintaining the worm and spring-held gear in balanced positions of adjustment with respect to one another, in which positions both members are freely rotatable about their respective axes while resiliently held in mesh with one another.

DONALD McSKIMMON.

References Cited in the file of this patent

UNITED STATES PATENTS

| Number | Name | Date |
|---|---|---|
| 800,853 | Kimball | Oct. 3, 1905 |
| 814,023 | Cromwell | Mar. 6, 1906 |
| 1,386,899 | Samuel | Aug. 9, 1921 |
| 1,611,578 | Aldeborgh | Dec. 21, 1926 |
| 1,703,120 | Steinle | Feb. 26, 1929 |
| 1,720,648 | Hallett | July 9, 1929 |
| 1,891,364 | Albertson et al. | Dec. 20, 1932 |
| 1,896,998 | Bennett | Feb. 7, 1933 |
| 1,937,936 | Aldeborgh et al. | Dec. 5, 1933 |
| 2,350,788 | Martin | June 6, 1944 |

FOREIGN PATENTS

| Number | Country | Date |
|---|---|---|
| 33,007 | Switzerland | Sept. 13, 1904 |
| 555,624 | Germany | July 25, 1932 |